(12) United States Patent
Bayram et al.

(10) Patent No.: US 9,760,973 B2
(45) Date of Patent: Sep. 12, 2017

(54) SEAM CARVING BASED ANONYMIZATION

(71) Applicant: New York University, New York, NY (US)

(72) Inventors: Sevinc Bayram, Barking (GB); Husrev T. Sencar, Abu Dhabi (AE); Nasir D. Memon, Brooklyn, NY (US)

(73) Assignee: NEW YORK UNIVERSITY, New York, NY (US)

( * ) Notice: Subject to any disclaimer, the term of this patent is extended or adjusted under 35 U.S.C. 154(b) by 125 days.

(21) Appl. No.: 14/520,947

(22) Filed: Oct. 22, 2014

(65) Prior Publication Data
US 2015/0110418 A1    Apr. 23, 2015

Related U.S. Application Data

(60) Provisional application No. 61/894,628, filed on Oct. 23, 2013.

(51) Int. Cl.
*G06T 7/00* (2017.01)
*G06T 3/00* (2006.01)
*G06T 1/00* (2006.01)

(52) U.S. Cl.
CPC .......... *G06T 3/0012* (2013.01); *G06T 1/0078* (2013.01); *G06T 1/0064* (2013.01); *G06T 2201/0051* (2013.01); *G06T 2201/0061* (2013.01); *G06T 2201/0065* (2013.01)

(58) Field of Classification Search
CPC .... H04N 1/3872; H04N 1/3875; H04N 1/387; G06T 5/001; G06T 11/60; G06T 3/0012; G06T 1/0078; G06K 9/3233; G06F 3/0484; G06F 3/04842
See application file for complete search history.

(56) References Cited

U.S. PATENT DOCUMENTS

| 8,213,745 | B2 * | 7/2012 | Kumar | G06T 3/0012 |
| | | | | 382/276 |
| 8,374,386 | B2 * | 2/2013 | Bayram | G06F 17/30799 |
| | | | | 382/100 |

OTHER PUBLICATIONS

Avidan et al. ("Seam Carving for Content-Aware Image Resizing", ACM Transactions on Graphics, vol. 26, No. 3, Article 10, Publication date: Jul. 2007).*

* cited by examiner

*Primary Examiner* — Duy M Dang
(74) *Attorney, Agent, or Firm* — Foley & Lardner LLP

(57) ABSTRACT

As image source attribution techniques have become significantly sophisticated and are now becoming commonplace, there is a growing need for capabilities to anonymize images and videos. Focusing on the photo response nonuniformity noise pattern based sensor fingerprinting technique, this work evaluates the effectiveness of well-established seam carving method to defend against sensor fingerprint matching. We consider ways in which seamcarving based anonymization can be countered and propose enhancements over conventional seam carving method. Our results show that applying geometrical distortion in addition to seam carving will make counter attack very ineffective both in terms of computational complexity and accuracy.

7 Claims, 12 Drawing Sheets

SEAM CARVING BASED ANONYMIZATION

CROSS REFERENCE TO RELATED APPLICATIONS

This application claims priority to U.S. Provisional Application No. 61/894,628 filed Oct. 23, 2013, reference of which is hereby incorporated in its entirety.

BACKGROUND OF THE INVENTION

Recent developments in multimedia forensics have made tremendous progress that allow forensics analysis of image and video data. Especially, source attribution methods made it possible to map images and videos to the specific camera or camcorder that they have been captured with. Although due to such methods, multimedia data now can be used as evidence in court of law, some ethical questions has also been raised addressing the individual rights to privacy and anonymity. It is especially important for the activists and human right defenders to stay anonymous while spreading their images and videos, such as during and after the Arab Spring events.

The problem of anonymizing images and videos against source attribution ultimately relies on the ability to circumvent underlying attribution techniques. Robustness of source attribution techniques under various image and video processing based operations and attacks has long been the focus of research and a number of techniques are already proposed to counter digital media forensics techniques.

To date, the most successful source attribution method was proposed by Lukas et al. This method fingerprints an imaging device by extracting the so called photo-response non-uniformity (PRNU) noise pattern. This noise pattern is an imperfection caused mainly by the impurities in silicon wafers and affects the light sensitivity of each individual pixel. The method utilizes an image denoising approach to estimate a sensor's PRNU noise pattern in a way that the resulting residue contains the needed noise components. However, since the underlying noise pattern model used in denoising is an idealistic one the residue signal also contains contributions from the image content. To eliminate this content-dependent component of the noise, denoising is applied to a set of images (captured by the same camera) and the corresponding noise residues are combined together with a maximum likelihood estimator to obtain the fingerprint of the camera. To determine whether a given image is captured by a digital camera, a fingerprint is estimated from an individual image and this fingerprint is compared with the camera's fingerprint using normalized correlation (NC) or peak to correlation energy (PCE), which determines the sharpness of correlation peak. A decision is made by comparing the measured statistic to a pre-determined decision threshold. Goljan et al. also showed that PRNU noise pattern can be reliably extracted under JPEG compression with a quality factor as low as 50% even if an image is rescaled or cropped.

There are two possible approaches to attacking PRNU noise pattern based source attribution technique. The first approach relies on weakening the PRNU noise pattern, which can be achieved by subjecting the images to strong filtering or severe compression, so that PRNU noise pattern cannot be reliably detected. Alternatively, since each PRNU noise estimate value is related to a pixel's light sensitivity, it is very important to align the two noise values extracted from the same pixel when computing the matching statistic. Therefore, the second approach focuses on disturbing the alignment between the two noise patterns, rather than trying to remove the pattern itself. Although the two approaches are not exclusive of one another, they can be compared on the basis of what level of reduction in the image quality they cause to achieve a desired level of anonymization. In this regard, the techniques included in the former approach are more intrusive and are not content-aware in most cases. As a result, anonymity is achieved at the expense of severe reduction in the image quality. The latter approach, however, potentially offers a better trade-off between image quality and level of anonymization as synchronization at the detector can be attacked by introducing perceptually less disturbing artifacts.

The most straight forward way to accomplish de-synchronization (i.e., misalignment) is to apply geometrical transformations such as resizing, rotation and barrel distortion. Goljan et al. showed that the parameters of geometrical distortions can be determined by a brute-force search using fingerprint digests, and fingerprints can still be aligned if they are of the same camera. This work showed that effective anonymization against image source attribution needs to utilize irreversible (non-revertible) transformations.

Another way to prevent fingerprint alignment is to delete parts of an image so that rather than shifting the whole pixel coordinate system only parts of it are shifted by arbitrary amounts. This can be realized by randomly removing rows and columns from the image. Although this may work satisfactorily on nature images, it will cause noticeable visual distortions especially if the image has well-defined geometrical structures. As an example, see the coins image in FIG. 1-$a$ where the columns marked in red are removed to obtain the image in FIG. 1-$b$. As can be noticed, after deletion, the edges of the coins have become non-smooth, which shows that random removal of column pixels will not produce visually desirable images. Moreover, based on the visual distortions, one might very reliably guess which columns are removed, and take this information into account when performing matching. As a consequence, reliable anonymization of images require more sophisticated methods that not only can distort the alignment in a very complicated manner but also at the same time ensure the visual quality of the modified image.

SUMMARY OF THE INVENTION

The foregoing summary is illustrative only and is not intended to be in any way limiting. In addition to the illustrative aspects, embodiments, and features described above, further aspects, embodiments, and features will become apparent by reference to the following drawings and the detailed description.

One implementation relates to a method of anonymization of images against source attribution comprising irreversibly transforming an image and concealing the source of the image by altering one or more properties of the image.

Another implementation relates to a method of anonymization of images against source attribution comprising irreversibly transforming an original digital image into an anonymized image. The irreversible transforming is by determining a plurality of seams for the image and adding or removing at least one pixel from one of the determined seams. Pixel correspondences between the original image's sub-blocks and the anonymized image's sub-blocks are not preserved.

Another implementation relates to a method of anonymization of images against source attribution comprising determining a plurality of seams for an image, determining a plurality of fake seams, and altering the image by removing the plurality of seams and the plurality of fake seams. Altering the image leaves no untouched image blocks that are large enough to yield reliable statistics for successful matching.

Another implementation relates to a tangible computer-readable medium operatively connected to the processor and including computer code. The computer code is configured to determine a plurality of seams for an image and alter the image based upon the plurality of seams. Altering the image leaves no untouched image blocks that are large enough to yield reliable statistics for successful matching.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE PREFERRED EMBODIMENTS

Figure 1A:
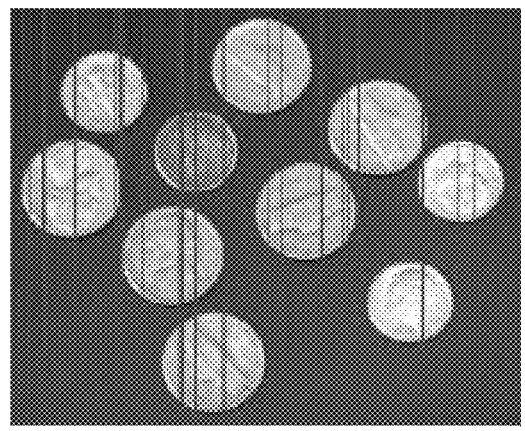
FIG. 1. (a) Coins image. Red lines mark the columns that are deleted. (b) Coins image after deletion of random columns of pixel data.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are systems and methods for anonymization of image and video sources. One implementation utilizes seam-carving to combat potential source attribution. Three type so fingerprints are references herein: 1) camera fingerprint, 2) individual fingerprint estimate, and 3) non-matching fingerprint. The first one is the camera fingerprint, which is obtained by averaging several fingerprint estimates extracted from images captured by the same camera. The camera fingerprint is defined as $F_i^c = X_i^c + \epsilon_i^c$ where $X_i^c$ is the real fingerprint and $\epsilon_i^c$ is the modeling noise. The second fingerprint is an individual fingerprint estimate extracted from a given image captured by a camera with fingerprint $X^c$. This fingerprint is considered as a matching fingerprint and denoted as $F_i^m = X_i^c + \epsilon_i^m$. Finally, the last fingerprint is a fingerprint estimate extracted from an image captured by a camera with fingerprint $X^n \neq X^c$. This fingerprint is called non-matching fingerprint and is denoted by $F_i^n = X_i^n + \epsilon_i^n$. It is assumed that all three fingerprints are normally distributed random sequences with zero mean and unit variance, i.e., such that the modeling noise $\epsilon_i^{c,n,m} \sim N(0,\sigma^2)$ and the actual fingerprints $X_i^{c,n} \sim N(0,1-\sigma^2)$, where $i=1, \ldots, N$, and $M=A \times B$ for A and B are the dimensions of the fingerprints.

In general, one implementation utilizes a method wherein multimedia data is received, an irreversible transformation is performed, concealment occurs and anonymized multimedia data results.

Figure 1B:
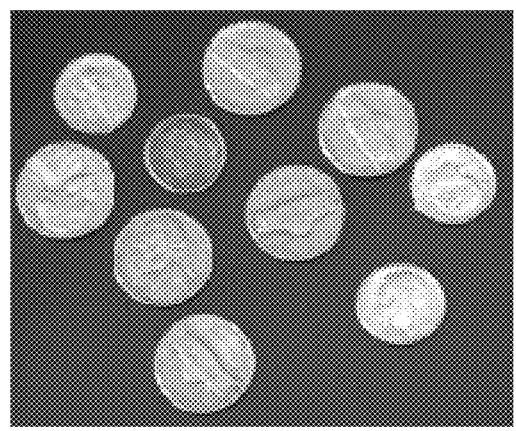
Figure 2A:
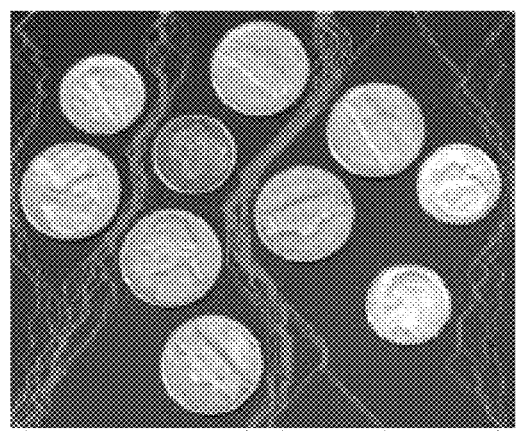
FIG. 2. (a) Coins image with vertical seams (b) Coins image after seam carving
Figure 2B:
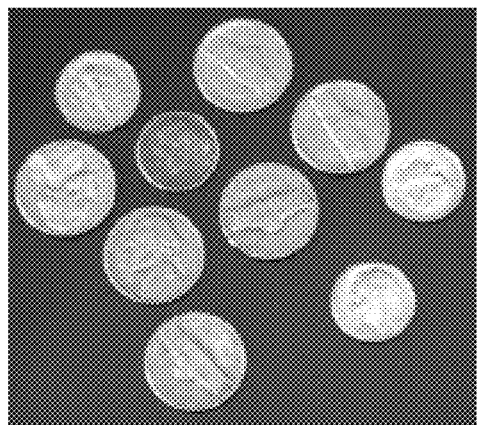
Figure 3A:
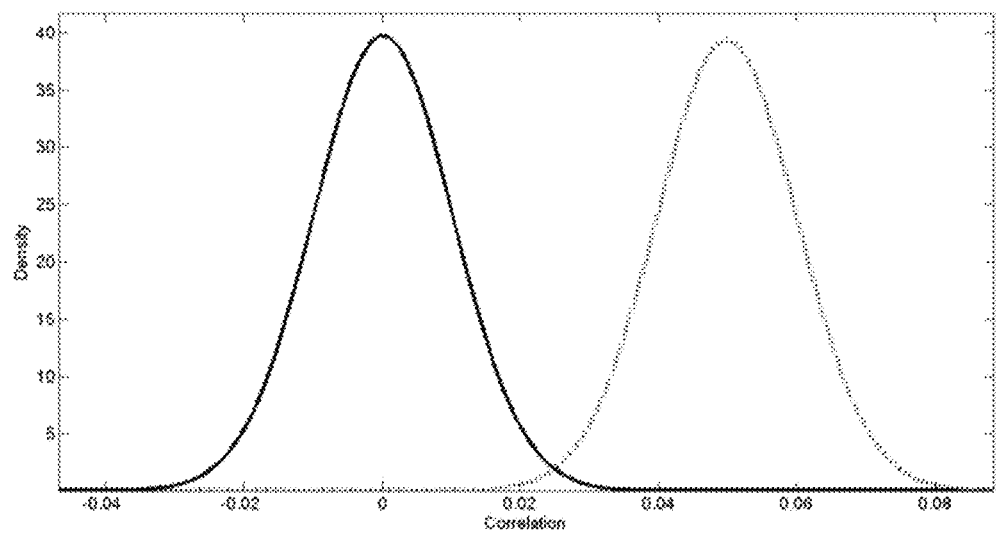
FIG. 3. The distributions of correlation when $1-\sigma^2=0.05$ computed assuming the ideal case, i.e., disregarding the influence of content related noise on the fingerprint. The straight lines show the non-matching correlation $\rho^n$, the dotted lines show the matching correlation $\rho^m$ for (a) $a \times b=10000$ (100×100)(b) $a \times b=2500$ (50×50). Actual distributions for (c) $\rho^n$ and (d) $\rho^m$ measured empirically through analysis of images captured using 6 digital cameras, including mobile, DSLR, and compact cameras, when $a \times b=10000$ (100×100). These results show the change in $\rho^m$'s distribution due to increasing prevalence of content related noise on the fingerprint when $a \times b$ is relatively small.
Figure 3B:
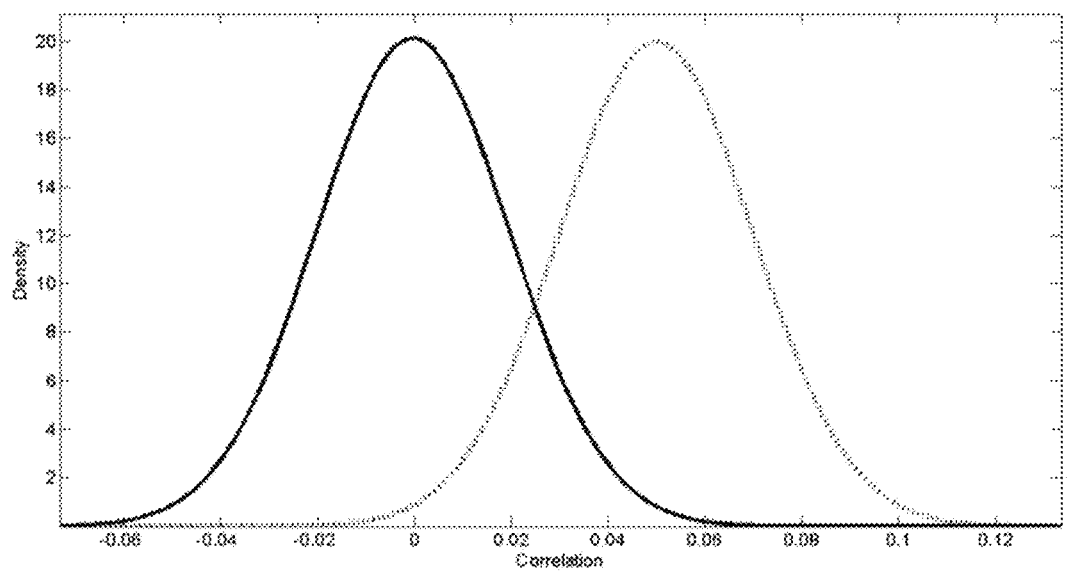
Figure 3C:
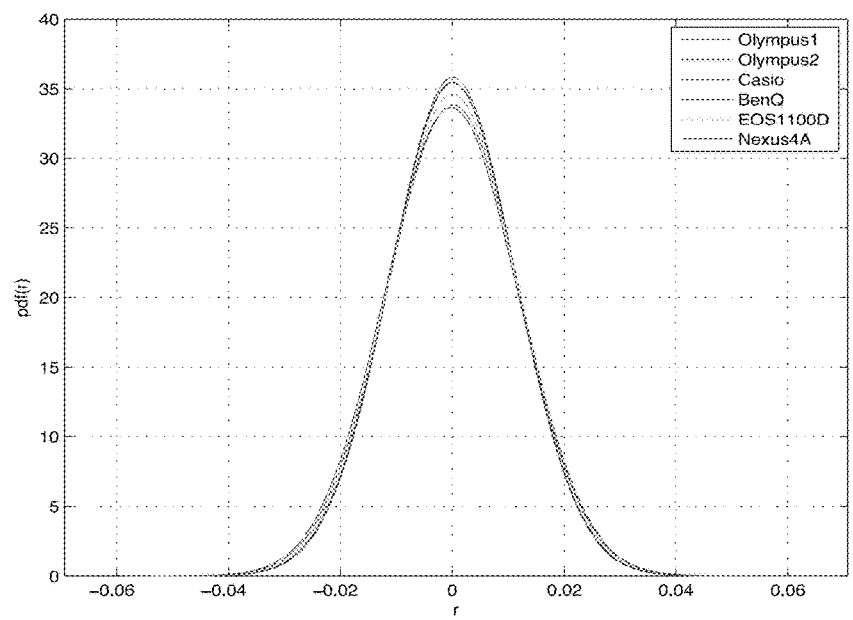
Figure 3D:
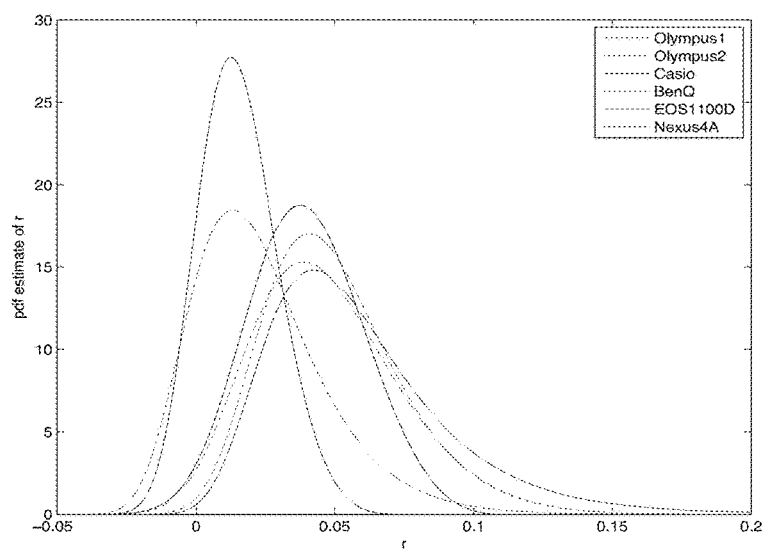

In one implementation, seam carving has been introduced to perform content-aware image resizing as an irreversible transformation. Although the implementations discussed herein primarily focus on downsizing an image or subtractive seam carving, the image can be upsized by additive seam carving in other implementations. In traditional image downsizing, where the whole image is resized by a fixed scale factor, some important image details loose clarity. One aspect of seam-carving is to resize the image by removing the unnecessary parts while keeping important parts/objects intact in the image. A seam is either vertical or horizontal connected path of low energy pixels in the image. Finding a seam to be removed is realized by first computing the energy of each pixel. This can be done by various methods such as gradient magnitude, entropy, visual saliency, eye-gaze movement. The seam that has the minimum total energy is found by using a dynamic programming method. FIG. 2 shows the vertical seams for the coins image. This can be compared to the image of FIG. 1A-B where the subtracted portions of the image were random columns rather than seams. As can be seen, the seams do not cross the edges of the coins since the magnitude of gradient on the edges would be high. In this particular image, due to the lack of details in the areas removed, seam-carving has not introduced any visual distortion. However, when many seams are removed or if the image has high energy content all across, seam-carving might cause visual distortions as well. In fact, seam carving does not work for all images and can result in very bad perceived image quality for images with regular geometric textures.

When an image is downsized by seam-carving, pixels along the paths of the selected seams are removed, and all remaining pixels are shifted horizontally or vertically to fill the gap. In one implementation, the movement of the pixels is defined at the beginning of the process, e.g., if a vertical seam is calculated, the shift will be vertical. In one implementation, both vertical and horizontal seams are removed in no particular order. What is more is that the analysis of the seam-carved image will not trivially yield information about the locations of the seams and the number of removed seams (unless the original frame size is known). In the context of image fingerprint matching, this loss of information is very critical. The fact that seam carving cannot be reversed assures that sensor fingerprint obtained from a seam-carved image cannot be aligned with the corresponding camera fingerprint by known methods.

1. Counter Attacks Against Sensor Fingerprint Anonymization by Conventional Seam-Carving If a video is anonymized by seam carving, there is no straight forward way to counter it, since each frame with different scene would have different seams removed from it. For certain implementations, seam carving of video frames may be sufficient to anonymize since each fingerprint of a video is the average of a fingerprint of each frame and seam carving of different parts of each frame will render the obtained average incoherent. To obtain a fingerprint of a camcorder's sensor, the fingerprint estimates from multiple frames with different scenes have to be combined. This is not possible after seam carving since the fingerprint estimates would not be aligned anymore. However, it must be noted that when seam carving is performed on each video frame separately there would be very noticeable video artifacts due to the different changes in alignment between the frames. To avoid such artifacts, time continuity of the carving needs to be taken into account when seams are being selected. Nevertheless, in all cases developing a counter measure against video anonymization will be more difficult than it is for images.

Therefore, in one implementation, counter-measures and improvements for camera sensor fingerprint anonymization are provided. Since seam-carving is not likely to touch the parts of an image that has high gradient energy (e.g., the coins in FIG. 2), it is still possible to perform block-based sensor fingerprint matching when a camera fingerprint is concerned. Instead of comparing two full fingerprints; a block from the fingerprint which is known to be seam carved can be searched inside the other full fingerprint which is known to be untouched. This would be called block-based matching. However, the accuracy of sensor fingerprint matching depends on the block size so, the smaller the block is, the less accurate the match is.

Figure 4A:
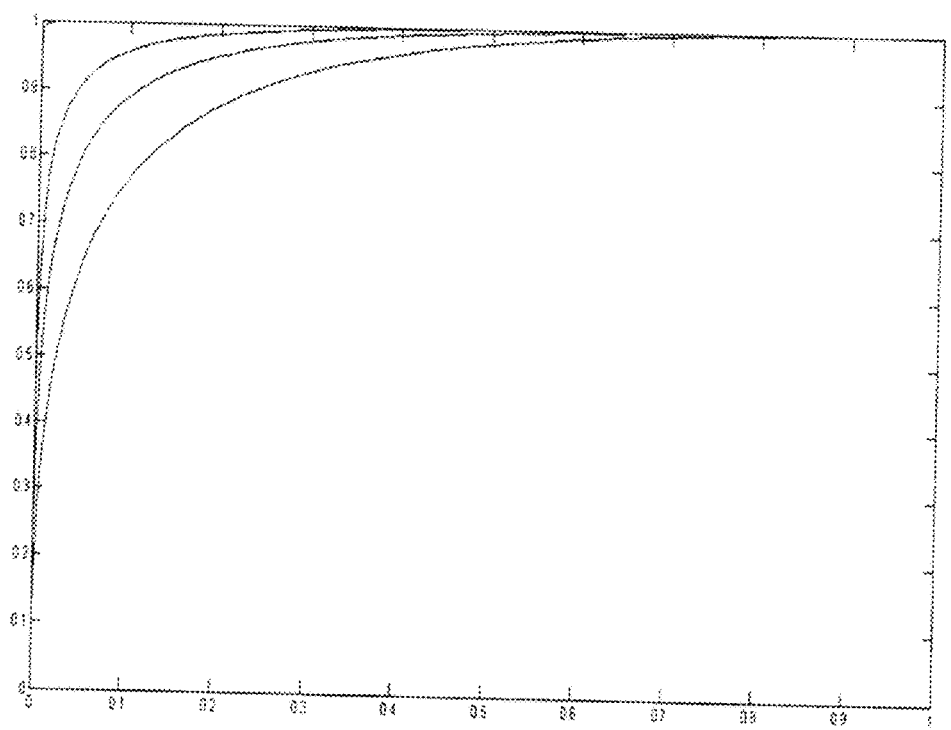
FIG. 4. (a) ROC curves for different sized fingerprint blocks ($a \times b=1000, 1500, 2500, 10000$) obtained assuming the ideal case, i.e., disregarding the influence of content related noise on the fingerprint, and (b) ROC curves obtained empirically by analysis of images captured by 6 different cameras using 6 digital cameras, including mobile, DSLR, and compact cameras, when $a \times b=10000$ (100×100).
Figure 4B:
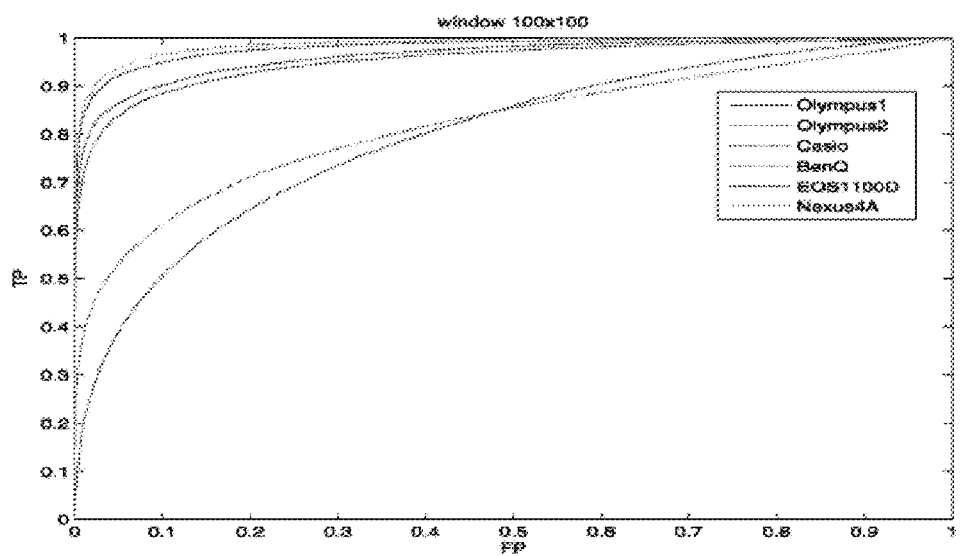

However, block-based matching will reduce the reliability of sensor fingerprint matching, since as shown in prior work, the size of the fingerprint effects the reliability of the outcome greatly. In fact, for the general case, the distribution of correlation between two matching fingerprint blocks can be written as $$\rho^m(F^c, F^m) \sim N\left(1 - \sigma^2, \frac{1}{ab}\right)$$

for a block of size a×b pixels. However, as a×b gets smaller in value and the image noise introduced to the fingerprint due to the image content becomes more prevalent. As a result, the distribution of $\rho^m$ deviates away from the Normal distribution towards an extreme value distribution with modeling parameters depending on the camera itself. The distribution of correlation between two non-matching fingerprint blocks, however, will follow $$\rho^n(F^c, F^n) \sim N\left(0, \frac{1}{ab}\right)$$

for all values of a×b. The distributions corresponding to $\rho^m$ and $\rho^n$ for a×b=10000 and a×b=2500 obtained assuming the ideal case (which disregards the influence of the content) and the ones obtained empirically from actual digital cameras can be seen in FIG. 3. As seen in the figure, the larger a×b is, the more separable the two distributions are, and better the performance of matching will be. As a result, the probability of false positive and true positive for a single match under the ideal case can be written as:

$$P_{FA} = Q(\tau\sqrt{ab}) \quad (1)$$

$$P_{TP} = Q\left(\frac{(\tau - 1 + \sigma^2)\sqrt{ab}}{1 - (1 - \sigma^2)^2}\right)$$

where $\tau$ is a preset threshold. FIG. 4 displays the ROC curves corresponding to different a and b values, when $1-\sigma^2=0.05$. (Note that $1-\sigma^2$ is the mean correlation between the matching fingerprints, and this value can be determined for a given camera by obtaining the distribution of correlation values between the matching fingerprints of the camera.) These ROC curves are obtained using the NC values for the blocks that align perfectly. Similar results are also obtained empirically on actual images acquired by different digital cameras. Corresponding results are also given in FIG. 4.

These statistics are only valid if the blocks are aligned properly. However, after seam-carving it will not be possible to exactly identify where in the camera fingerprint the block of PRNU that contains the coin can be found. Therefore the PRNU of the determined block must be searched within the camera fingerprint. Since searching via PCE would be more involved in computational complexity (PCE has to be calculated for (C−a+1)×(D−b+1) times for each block) it is more sensible to use normalized cross correlation (NCC). The match between the camera fingerprint and the part of the matching image fingerprint can be established when NCC takes a value greater than a preset threshold. Since we might have many blocks to search, the computational complexity for calculating NCC between a fingerprint block and a camera fingerprint might increase a lot. However, it must be noted that one does not need to search the whole camera fingerprint since the approximate location can be determined from the image. It is obvious that if the block we are searching is in the middle of the seam-carved image, it should have been closer to the middle of the original image as well.

For the sake of simplicity, assume a fingerprint block of dimensions a×b has to be searched in a camera fingerprint block of dimensions C×D. (The a×b-sized block may correspond to fingerprint extracted from a block of image that has undergone seam carving.) The search will involve computing NCC values at all shifts of the smaller window within the larger sized window. If the shift position that yields the highest NCC value is higher than the preset threshold $\tau$, then a match will be declared. Otherwise, the two fingerprint blocks will be deemed non-matching. Let $\rho$ be the NCC value computed between two a×b-sized fingerprint blocks, $\rho_i^n$ be the NCC value when there is no match between the two fingerprint blocks and $\rho^m$ correspond to the value when the fingerprints match. This search will yield a false positive when out of the (C−a+1)×(D−b+1) possible shifts, the highest observed NCC value is from a non-matching fingerprint block and it exceeds the threshold $\tau$. That is, $$P_{FA} = P_\tau(\max_i(\rho_i^n) > \tau) \quad (2)$$

It can be seen in Eq. 2 that a false-positive is very likely since now one has to compare the best of the (C−a+1)×(B−b+1) match comparisons to a threshold, as opposed to making a decision based solely on a single comparison. Correspondingly, a correct decision will be made when $\rho^m$ is the largest of all observed NCC values. Thus, probability of detection $P_D$ can be written as $$P_D = P_\gamma(\rho^m > \max_i(\rho_i^n) \text{ and } \rho^m > \tau) \quad (3)$$

Figure 5:
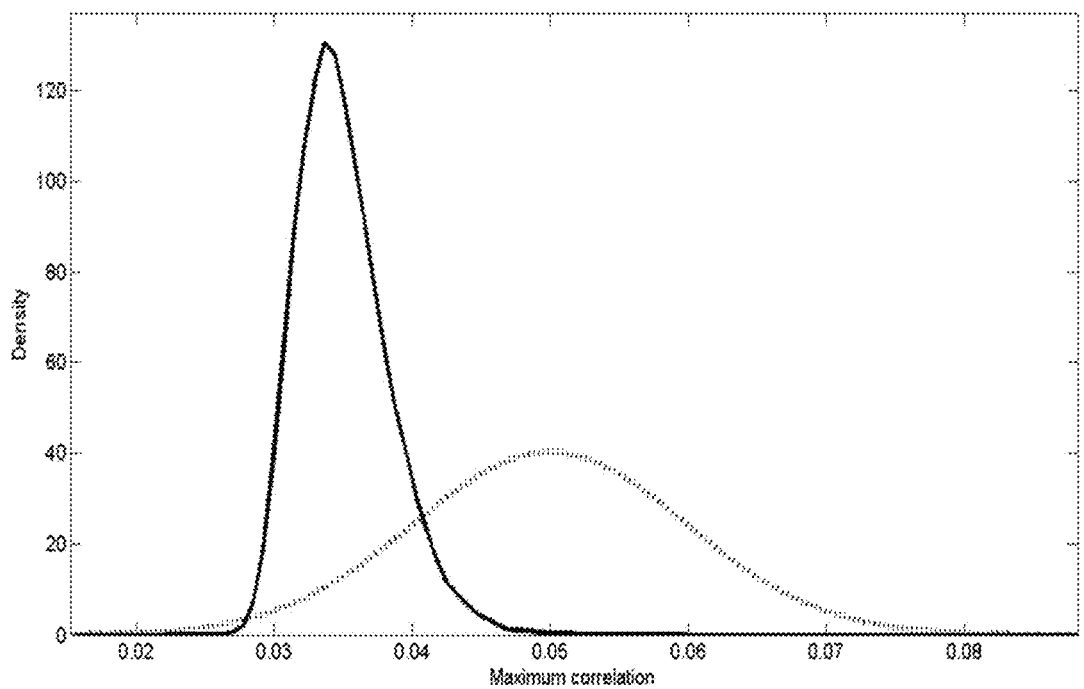
FIG. 5. Straight lines shows the distribution of maximum NCC values when no fingerprint block in C=D camera fingerprint matches $a \times b$ PRNU estimate. Dotted lines show the distribution NC values when two $a \times b$ fingerprints match together.

It can be seen that the increase in $P_{FA}$ will be paralleled by a decrease in $P_D$ as the probability distribution of the a maximum of a large number of NCC values will be positively skewed as compared to that of statistics that govern NCC values. In FIG. 5, solid lines shows the distribution of the maximum NCC values when the fingerprint block is not an actual match ($\rho^n$), and the dotted lines shows the distribution of NC values when the fingerprint block is a match ($\rho^m$). In these figures, a×b is 10000 while C×D is 22500, which corresponds to a search of 100×100 block in a 150×150 sized block. FIG. 5 shows that for the given block sizes, when the maximum of $\rho^n$ is taken it will be very close to the mean of the distribution of $\rho^m$. Setting a threshold higher than the mean of $\rho^m$ to reduce false positives will cause a decrease in the probability of detection.

One implementation of anonymization was tested on a digital camera, whose fingerprint strength can be modeled as $\sigma^2=0.994$, to determine the size of the untouched blocks that could be left while still achieving an acceptable level of anonymization. The table below shows for different sub-block size a×b and search-block size C×D empirically obtained true detection probabilities at the fixed false-positive probability of 0.01.

|  |  | False Positive Probability | True Positive Probability |
|---|---|---|---|
| a × b = 100 × 100 | C × D = 105 × 105 | 0.010000 | 2.223338e−03 |
| a × b = 100 × 100 | C × D = 110 × 110 | 0.010000 | 7.760234e−04 |
| a × b = 100 × 100 | C × D = 200 × 200 | 0.010000 | 1.609360e−05 |
| a × b = 100 × 100 | C × D = 1000 × 1000 | 0.010000 | 3.249288e−07 |

It must be remembered that $\sigma^2$ is a measure of the strength of an imaging sensor's fingerprint and as it has been established by earlier studies, $\sigma^2$ differs with each individual imaging sensor. Therefore given a digital camera, its estimated $\sigma^2$ value can be used to determine the needed minimum untouched sub-block size, i.e., a×b, to ensure resulting matching accuracy is below the designated accuracy values. Test results considering a wide range of practical $\sigma^2$ values show that, for the general case, there should not be many uncarved blocks larger than the size of 50×50 pixels for successful anonymization of the source camera.

Figure 6A:
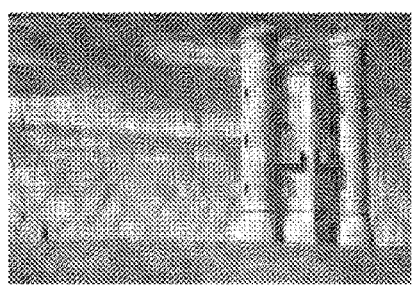
FIG. 6. (a) Castle image with 90 vertical seams (b) Castle image with 100 vertical seams. (c) Castle image with 100 vertical seams removed FIG. 7. (a) Castle image with random vertical and horizontal seams (b) Coins image after seam carving FIG. 8. (a) Coins image with random vertical and horizontal seams (b) Coins image after seam carving.
Figure 6B:
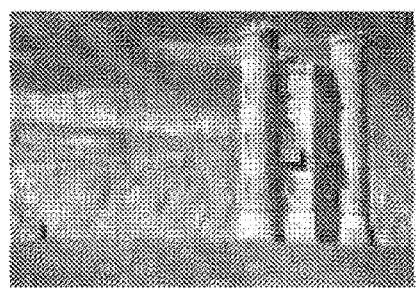
Figure 6C:
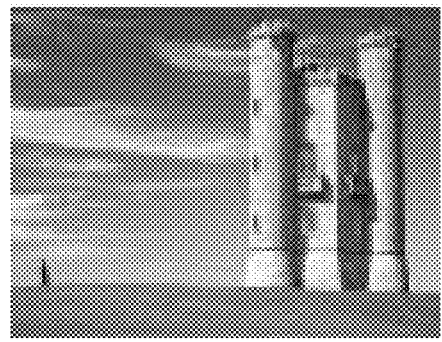

Furthermore, there are two important considerations when countering seam-carving. First concerns the fact that there is no guarantee there won't be a seam crossing the high gradient energy area that we have chosen, (i.e., a×b-sized block). FIG. 6 provides an example for this phenomenon. FIG. 6-a shows the first 90 vertical seams to be removed while FIG. 6-b shows the first 100 vertical seams, and FIG. 6-c shows the resulting image after removing 100 seams. It can be seen that, the more seams are removed, the more high gradient energy areas will be removed as well. This figure also shows that the visual distortion in the image is much less when a high gradient energy is removed by seam carving as compared to removing whole columns. The second concern is that, in general, PRNU noise extraction is not very successful in high gradient image areas, and therefore, high gradient image blocks produce low energy PRNU noise values.

Although these factors will make it difficult countering against seam carving, it may still be possible to extract and match fingerprints from the blocks of seam-carved image. Therefore, other measures may also be needed to effectively anonymize images.

2. Sensor Fingerprint Anonymization with Forced Seam Removal

In one implementation, seam carving is carried out such that it leaves no untouched image blocks that are large enough to yield reliable statistics for successful matching. For example, FIG. 5 shows that for a×b=10000 sized blocks the statistics are not reliable, but seam-carving might leave larger blocks than that (e.g., Castle image). In one implementation, the blocks are size 50×50. To break the relatively large untouched image regions into smaller pieces, one implementation introduces fake seams using the following procedure below:

Identify an image region that lies between two seams and can fit a rectangle of size a×b.

Pick a pixel in the identified region.

Calculate the gradient energy up and down (or left and right) from this pixel on until a minimum energy one is found as a full horizontal (or vertical) seam, and remove it. This can be realized very efficiently by modifying the obtained energy maps Repeat until no seam-carved blocks that are larger than a×b are left.

This procedure can be done in addition to conventional seam carving to break the large untouched areas into smaller blocks or the whole image can be seam-carved by introducing and removing fake seams.

Figure 7A:
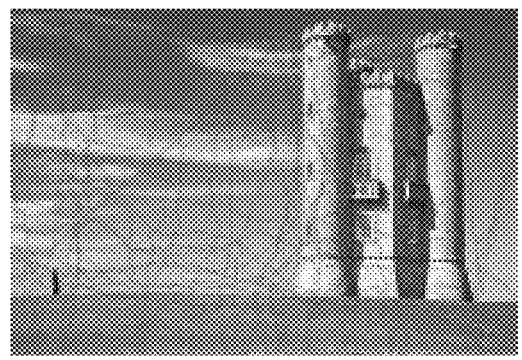
Figure 7B:
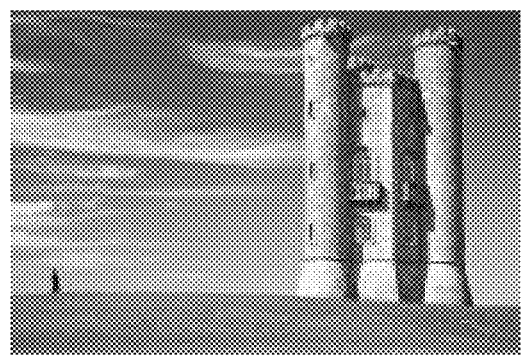
Figure 8A:
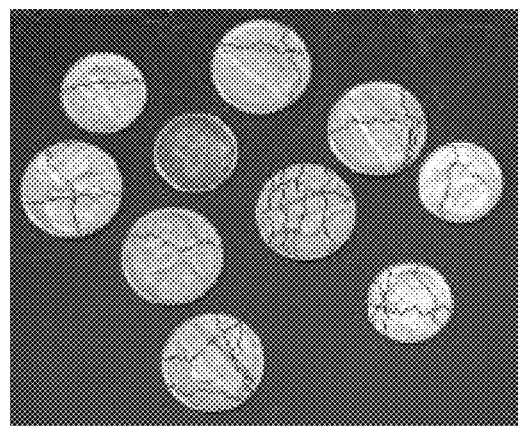
Figure 8B:
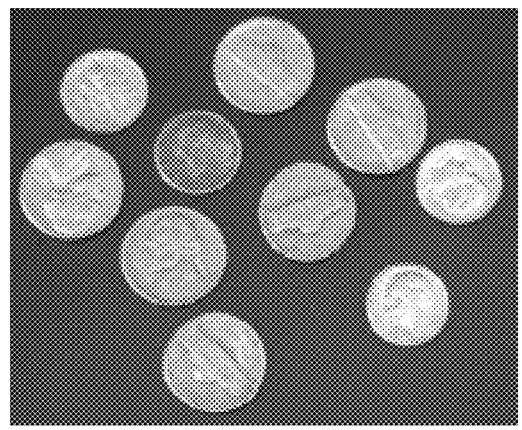

Another effective way to anonymize the image is to make sure a fake seam crosses hot and dead pixels since these are the pixels that effects a positive match the most. Hot and dead pixels aid the accuracy in sensor fingerprint matching. They are used to realign the fingerprints and also speed up the process. Therefore, removing them (as part of a seam) would decrease the accuracy of methods which uses their location. This can be done by choosing hot pixels and dead-pixels in the second step. Note that, in any case, this procedure has the risk of visually distorting the image when a and b take relatively smaller values, as it is then very likely to remove the details that a user would prefer to keep. One way to alleviate this problem would be to allow the user to mark the image blocks and guide the forced seam carving process. FIGS. 7 and 8 display example results obtained using this procedure when all the seams are fake, which is likely to introduce the highest visual distortion. Note that, although there is not much observed change in visual quality of the images. Regardless, when the anonymization of the image is needed, minor degradation in image quality can be tolerable.

3. Countering Forced Seam Removal

If it is known that an image has been subjected to removal fake seams, identification of untouched blocks will not be possible solely based on analysis of gradient energy. However, it may still be possible to obtain information by observing the regularity of JPEG blocking artifacts or traces of CFA interpolation. The most reliable way is to search every possible fingerprint estimate block within the camera fingerprint. This can be done by following the same procedure as in the counter-attack of conventional seam carving removal:

Divide the image into overlapping blocks.

Estimate the approximate block where the image block in question falls originally before seam carving, and calculate NCC for each and every a×b block.

The computational complexity of such an operation would be O(6ABCD $\log_2$ CD) and when A×B>>C×D this can be realized efficiently. However, a problem is that using a single a×b block will not be reliable enough to make a decision. Therefore, the blocks where NCC returns a maximum value that is greater than τ can be utilized together, rather than making individual decisions on each block, when performing source attribution. This could be realized by concatenating all the blocks (which were identified as potentially not have been subjected to seam carving) together to obtain a larger-sized block and NC or PCE should be calculated between this combined block and corresponding combined camera fingerprint blocks. Alternatively, individual matching statistics obtained from each block can be incorporated together to obtain an overall statistic. Word done by Dirik, Sencar and Memon more recently analyzed the effectiveness and limits of such attacks on the proposed forced seam-carving based source anonymization technique.

Although successful matching of fingerprints may still be possible, there are several errors a counter-attacker might make along the way, which may further decrease the reliability. These errors include the ones that might happen due to comparing maximum of a number of observations to τ or might be caused by the wrong estimation of the block's location in the original image (i.e., the C×D block). Both type of errors will result with the identification of a non-matching or a falsely matching block as the right block. Finally, since not every block that crosses the threshold will correspond to a correct identification, erroneously selected blocks might be combined together in obtaining a larger block for the matching. That is, when a number of a×b-sized blocks identified as matching the camera's fingerprint are combined together, those that are not correctly identified will yield an error during matching.

4. Sensor Fingerprint Anonymization with Geometric Distortion and Fake Seam Removal In addition to irreversible transformation, the image may undergo concealment to further anonymize the source. In order to provide as secure an anonymization as practical, the goal is to ensure that countering seam-carving based anonymization is as hard as possible. It should be appreciated that increasing the necessary computational complexity to fingerprint an image or video provides an additional level of security as the cost to fingerprint will be greatly increased. To increase the computational complexity, in one implementation, a geometrical transformation is applied on the image followed by seam carving. For example, Goljan and Fridrich describe a fast and effective way of matching sensor fingerprints when the image that fingerprint estimate is extracted from has undergone barrel distortion due to the optical zoom. Barrel lens distortion is an artifact associated with the use of wide-angle lenses and, in particular, zoom wide-angles. This effect causes images to be spherized, which means the edges of images will look curved and bowed. Barrel distortion can be defined as:

$$x'=x_p+(x-x_p)(1+\alpha r^2) \quad (4)$$

$$y'=y_p+(y-y_p)(1\times\alpha r^2) \quad (5)$$

where (x, y) is the original pixel location and (x', y') is the pixel location after barrel distortion, $(x_p, y_p)$ is the distortion center of the image and $r=(x-x_p)^2+(y-y_p)^2$ is the radial distance to the distortion center. Prior publications have made the assumption that geometrical center of the image is also the optical center in order to describe a procedure to search for parameter α only and to take advantage of the hot-pixels and dead pixels to reduce the search space.

In one implementation, a geometric distortion is introduced to the image. In one particular implementation, a barrel distortion(s) with distortion center(s) that are not the same as geometrical center are introduced. That distorted image is then seam-carved to remove the alignment even more. The seam-carving may include the use of fake seams as described above. Further, while introducing fake seams, one implementation further ensures that at least some seams cross the hot pixels and dead pixels mostly. Now, even if the counter attacker is able to estimate the location of the untouched blocks reliably, those blocks will not align with the camera fingerprinting due to barrel distortion. In such a case, the distortion center(s) $(x_p, y_p)$ and the distortion strength (a) have to be searched by brute force, making the anonymization much more effective while making the counter attack much more complex.

In another implementation, the multi operator re-targeting method proposed by Rubinstein et al. is utilized to achieve the increased anonymization discussed above but with less distortion on the visual quality. Based on user studies, those authors reported that the resizing operators such as scaling, cropping or seam-carving alone might not create the best results always. Therefore, they defined the resizing space as a space combining several resizing operators. They showed that a mixture of scaling, cropping and seam-carving will create the best retargetted images. In their method, they used these operators multiple times, in different orders. Multi-operator re-targetting method would also create the same effect as fake barrel distortion in addition to seam carving since the counter-attacker has to still brute-force all the parameters. This method will also ensure that anonymized images are visually as pleasant as possible.

In one implementation, if a user wants to keep the certain portions of an image or video visually pleasant, one can mark those areas so that less seams are removed from there. In a further embodiment, a user may selected whichever point is desired to have a seam cross and/or to put back the seam if it unacceptably reduces visual quality. The system in this case can calculate the probability of non-anonymization and suggest a user to insert another seam.

5. Additional Concealment Procedures

Some implementations utilize alternative or additional concealment procedures. For example, after seam-carving the image size will be reduced as compared to the original, to conceal this reduction in size it will be best to resize the image to a known resolution. An issue concerning the application of non-uniform transformations after seam-carving is the potential use of many image forensics techniques, proposed to detect and localize variety of tampering techniques. Although these techniques are not reported to be very accurate, they can nevertheless be used to determine the transformation parameters in different parts of the image and to restore the seam-carved image. To defend against such reconstruction attempts, one approach would be to resample the image with a known CFA and save it as a JPEG with selected parameters. To the best of inventors' knowledge, there is no technique that can detect parameters of transformation and is also robust to resampling and JPEG compression. The concealment step can be finalized by ensuring that characteristics of the media, like compression parameters, CFA interpolation pattern and technique, encoding method, ExIF options, etc. are all in line with those of a well-known device model to further weaken the reliability of fingerprint matching process.

6. Results

Figure 9:
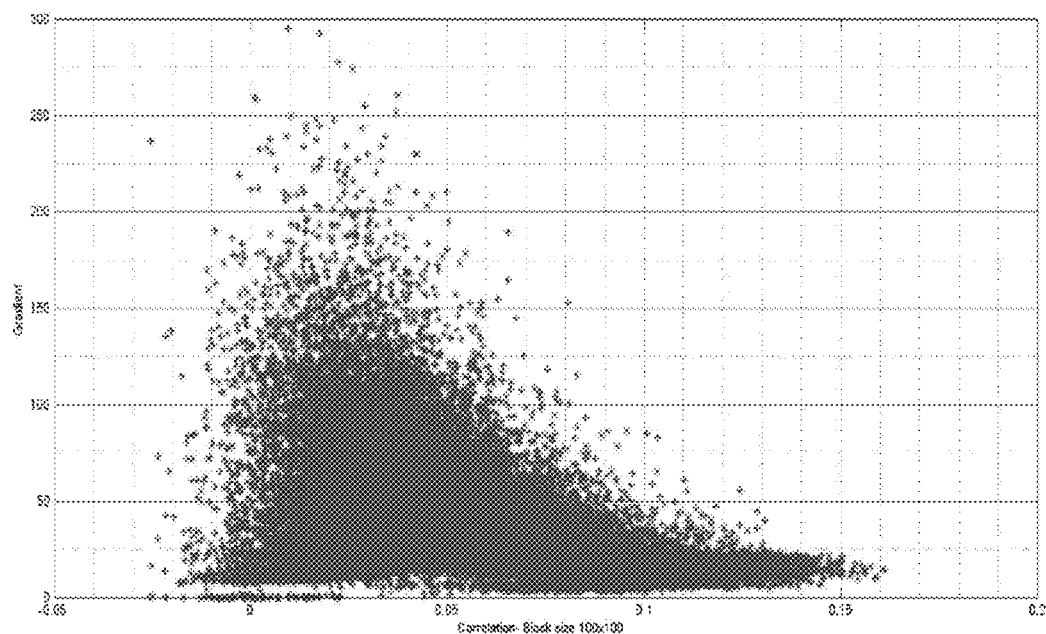
FIG. 9. Correlation values of 100×100-sized matching fingerprint blocks given as a function of the mean gradient of the corresponding image blocks.

Initially, it is important to consider how gradient of an image block affects the reliability of fingerprint matching process when correlation is used as a statistic for matching. For this purpose, 100 images were obtained from a Panasonic Lumix Camera and sensor fingerprints extracted from all of the images. 50 of the fingerprints were averaged together to get the camera fingerprint. The camera fingerprint and the rest of fingerprint estimates were divided into 100×100 blocks and the matching blocks correlated with each other. FIG. 9, displays the computed correlation values as a function of the mean gradient of the image block that fingerprint estimate has been extracted from. It can be seen in this figure that, for low gradient blocks correlation values vary widely. However, at high correlation values, the mean gradient is consistently low.

Figure 10:
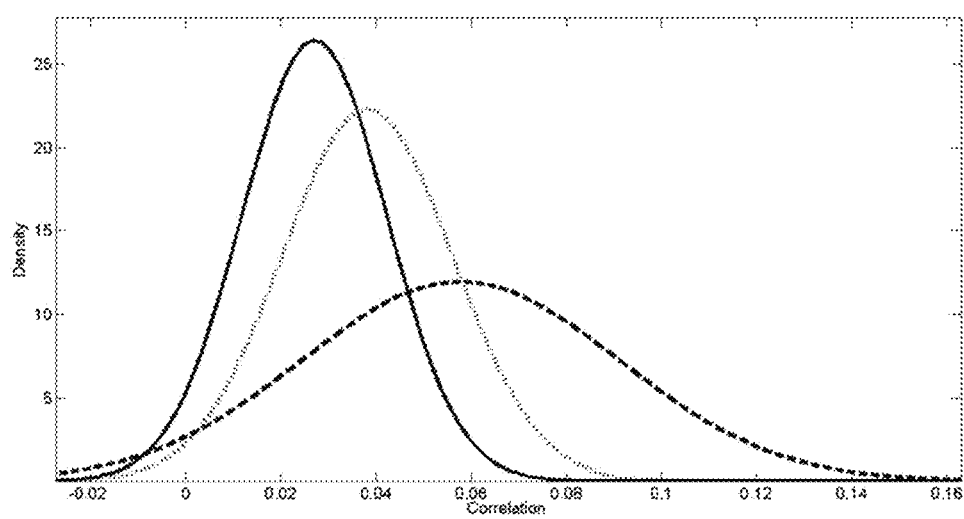
FIG. 10. Distribution of matching correlation values for 100×100-sized fingerprint blocks solid lines corresponding high gradient, dotted lines corresponding middle gradient and dashed lines corresponding low gradient image blocks FIG. 11. Straight lines shows the distribution of maximum NCC values when no fingerprint block in 150×150 camera fingerprint matches 100×100 PRNU estimate. Dotted lines show the distribution NC values when two 100×100 fingerprints match together.

FIG. 10 shows the distributions of correlation for three different levels of gradient. Here, the gradient values are calculated using the average gradient of the block that is in question. The correlation of fingerprint blocks that have high mean gradient with camera fingerprint is shown with solid lines while the correlation of fingerprint blocks that have mid-range gradient values is shown in dotted lines. Finally, the distribution of correlation for low-gradient blocks is shown with dashed lines. This figure shows clearly that in practice, gradient of an image block has a great effect on the block-based fingerprint matching and the lower the gradient is, the more reliable the results are. Thus, implementations that utilize seam-carving with a bias towards low gradient areas should provide better anonymization.

Figure 11:
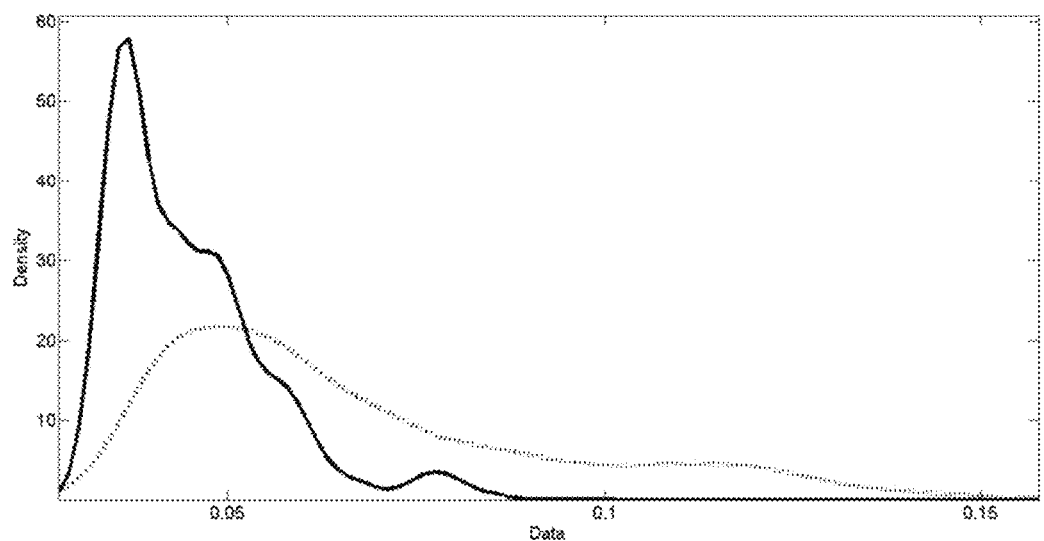

FIG. 5 illustrates the distribution of maximum NCC values obtained through simulations. For this example, the same dataset as in the previous experiment was utilized plus pictures from another camera, a Canon Powershot SC240 HS, to measure the distribution of non-matching NCC values. a×b-sized blocks were extracted from the fingerprint estimates of Canon pictures and searched in C×D blocks of Panasonic camera fingerprint using NCC. The distribution of maximum NCC values for a×b=10000 sized blocks and varying C×D block sizes are shown with solid lines in FIG. 11. Further, a×b=10000-sized blocks were obtained from fingerprint estimates of Panasonic camera and searched them in C×D-sized blocks of camera fingerprint of Panasonic camera. Each a×b-sized block was checked to actually fall into the C×D-sized block. The distribution of correlation values obtained at the matching locations (i.e., when alignment is restored) can be seen with dotted lines in FIG. 11.

Figure 12A:
FIG. 12. (a) Seams that are found using conventional seam carving. (b) Conventionally seam-carved image FIG. 13. (a) Fake seams that cross random pixels. (b) Image after fake seam
Figure 12B:
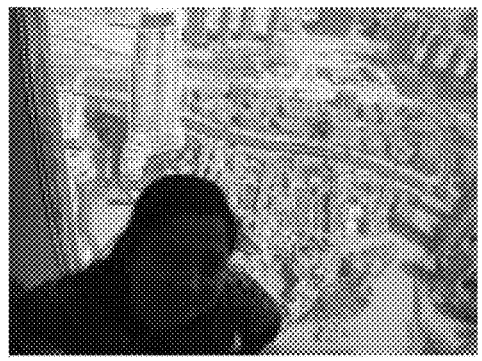
Figure 13A:
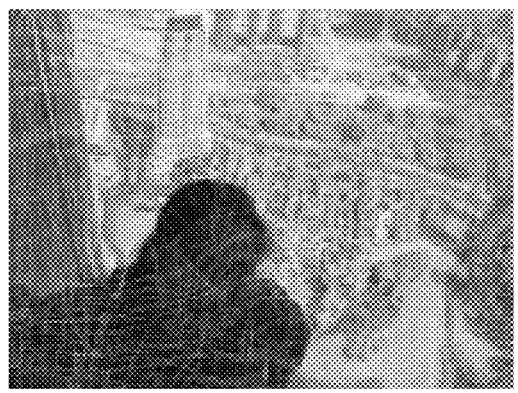
Figure 13B:

As noted, fake seam removal should be performed to minimize the impact on the visual quality of the image (or the video assembled from the frames). FIG. 12 provides the results for the conventional seam-carving method on a portrait photo with a busy background. Since the face in this figure is the smoothest part, most seams pass through it. Alternatively, FIG. 13 shows the fake-seams that pass through randomly selected pixels. Since in this case the focus is not the face anymore, the end result is visually less distorted.

Subjecting images to severe image compression or strong filtering can provide anonymization against PRNU noise pattern based source attribution, however, there may be many cases where image details need to be preserved as much as possible. Further, it should be noted that attacks targeting removal of PRNU noise pattern and de-synchronization attacks are not exclusive of each other and they can be combined together to obtain better quality images and videos to provide better anonymization.

Figure 14:
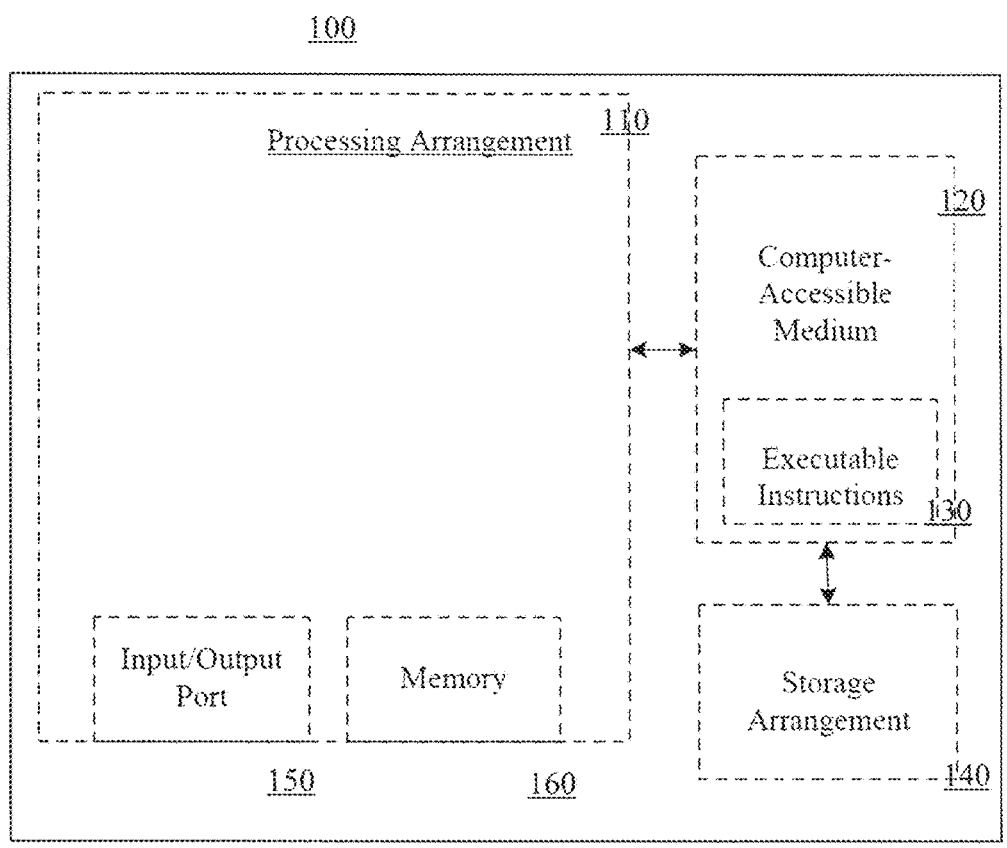
FIG. 14 illustrates an embodiment of a computer system of the present invention.

In one implementation, a system is provided for executing the methods described herein. In one implementation, the systems and methods describe above utilize or are executed on a computer system. One implementation of a computer system is shown in FIG. 14 with a system 100. FIG. 14 shows an exemplary block diagram of an exemplary embodiment of a system 100 according to the present disclosure. For example, an exemplary procedure in accordance with the present disclosure can be performed by a processing arrangement 110 and/or a computing arrangement 110. Such processing/computing arrangement 110 can be, e.g., entirely or a part of, or include, but not limited to, a computer/processor that can include, e.g., one or more microprocessors, and use instructions stored on a computer-accessible medium (e.g., RAM, ROM, hard drive, or other storage device).

As shown in FIG. 14, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. A method of anonymization of images against source attribution comprising:
   irreversibly transforming an original digital image into an anonymized image by:
      determining a plurality of seams for the image;
      adding or removing at least one pixel from one of the determined seams;
   wherein pixel correspondences between the original image's sub-blocks and the anonymized image's sub-blocks are not preserved,
   removing one or more fake seam by:
      a) identifying an image region that lies between two determined seams of the plurality of seams;
      b) selecting a pixel in the identified image region;
      c) calculating gradient energy in a first direction and a second direction from the pixel in the identified region until a minimum energy is found as a full horizontal or vertical fake seam; and
      d) removing the full horizontal or vertical fake seam.

2. The method of claim 1, further comprising adding or removing at least one pixel from each of the determined seams.

3. The method of claim 2, further comprising: creating one or more fake seams by:
   treating the removed full horizontal or vertical fake seam as a seam of the determined plurality of seams;
   repeating removal of the one or more fake seams until no image region between two determined seams of the plurality of seams larger than a predetermined size are left.

4. The method of claim 3, wherein the predetermined size is equal to or less than about 50×50.

5. The method of claim 2, wherein altering the image comprises removing the determined plurality of seams and shifting the remaining pixels.

6. The method of claim 2, further comprising the distorting the image prior to determining the plurality of seams.

7. The method of claim 1, wherein the one or more fake seams cross hot and dead pixels.

* * * * *